(12) United States Patent
Bauer et al.

(10) Patent No.: US 7,284,774 B2
(45) Date of Patent: Oct. 23, 2007

(54) PLUG-IN COUPLING FOR CONNECTING A FLUID LINE TO A PIPE

(75) Inventors: Andreas Bauer, Maintal (DE); Oliver Strauss, Nidderau (DE); Reiner Koch, Obernburg (DE); Sigrid Becker, Klingenberg (DE)

(73) Assignee: NORMA Germany GmbH, Maintal (DE)

( * ) Notice: Subject to any disclaimer, the term of this patent is extended or adjusted under 35 U.S.C. 154(b) by 161 days.

(21) Appl. No.: 11/043,322

(22) Filed: Jan. 26, 2005

(65) Prior Publication Data

US 2005/0167980 A1    Aug. 4, 2005

(30) Foreign Application Priority Data

Jan. 29, 2004    (DE) ................ 10 2004 004 364

(51) Int. Cl.
   *F16L 37/00*    (2006.01)
(52) U.S. Cl. .............. 285/319; 285/308; 285/921
(58) Field of Classification Search .............. 285/319, 285/308, 321, 921
   See application file for complete search history.

(56) References Cited

U.S. PATENT DOCUMENTS

| | | | | |
|---|---|---|---|---|
| 3,394,954 | A | * | 7/1968 | Sarns .................. 285/319 |
| 3,990,727 | A | * | 11/1976 | Gallagher ............... 285/26 |
| 4,673,200 | A | * | 6/1987 | Miyauchi ............... 285/319 |
| 4,991,882 | A | * | 2/1991 | Gahwiler ............... 285/331 |
| 5,267,757 | A | * | 12/1993 | Dal Palu ............... 285/148.21 |
| 5,586,791 | A | | 12/1996 | Kirchner et al. |
| 6,688,654 | B2 | * | 2/2004 | Romero ................ 285/308 |

FOREIGN PATENT DOCUMENTS

| | | |
|---|---|---|
| DE | 94 05 775 | 10/1994 |
| DE | 44 29 496 | 6/1995 |
| DE | 44 29 498 | 8/1995 |
| DE | 196 53 866 | 7/1997 |
| DE | 197 27 518 | 1/1999 |
| EP | 1 070 899 | 1/2001 |

* cited by examiner

*Primary Examiner*—David Bochna
(74) *Attorney, Agent, or Firm*—Friedrich Kueffner

(57) ABSTRACT

A plug-in coupling for connecting a fluid line with a pipe having a circumferential holding rib includes a pipe piece with a first end portion connectable to the fluid line and a second end portion which can be plugged together with the pipe, wherein the second end portion is connectable to a first coupling ring part of a coupling ring and is connected through elastic holding arms to a non-circular elastically expandable second coupling ring part. The second coupling ring part has locking sections which are distributed over a predetermined circumferential angle range of a circumference of the pipe piece. When the pipe and pipe piece are plugged together, the locking sections slide over the holding rib and expand the second coupling ring part and engage behind the holding rib, wherein the components located between the locking sections of the second coupling ring part are arched outwardly. The second coupling ring part has at least three locking sections and the circumferential angle range is greater than 180°, wherein the outwardly arched parts protrude beyond the circumscribed circle of the locking projections.

6 Claims, 2 Drawing Sheets

PLUG-IN COUPLING FOR CONNECTING A FLUID LINE TO A PIPE

BACKGROUND OF THE INVENTION

1. Field of the Invention

The present invention relates to a plug-in coupling for connecting a fluid line with a pipe which includes a holding rib extending in circumferential direction. The plug-in coupling includes a pipe piece with a first end portion connectable to the fluid line and a second end portion which can be plugged together with the pipe, wherein the second end portion is connectable to a first coupling ring part of a coupling ring which ring part is connected through elastic holding arms to a non-circular elastically expandable second coupling ring part. The second coupling ring part has locking sections which are distributed over a predetermined circumferential angle range of a circumference of the pipe piece. When the pipe and pipe piece are plugged together, the locking sections slide over the holding rib and expand the second coupling ring part and engage behind the holding rib, wherein the components located between the locking sections of the second coupling ring part are arched outwardly.

2. Description of the Related Art

In a plug-in coupling of this type, known from DE 44 29 498 C1 or EP 1 070 899 A2, FIG. 12, the coupling ring part has an approximately overall elliptical shape. An inwardly projecting locking projection each is integrally formed at the ends of the short elliptical axis, wherein the locking projections engage behind the holding rib when the pipe and pipe piece are plugged together. Consequently, the pipe and the pipe piece are coupled to each other and the pipe is connected to the fluid line which is mounted on the pipe piece. For releasing the coupling, a manual pressure is exerted on the ends of the long elliptical axis directed inwardly toward the short elliptical axis. This deforms the elastic coupling ring part, so that the long elliptical axis is shortened and the short elliptical axis is elongated until the locking projections are disengaged from the holding rib and the pipe piece can be pulled out of the pipe.

This type of uncoupling can be carried out manually in a simple manner, however, this uncoupling is undesirable in many types of applications in order not to spill the fluid which is conducted through the pipe and the fluid line and which may be very hot or environmentally damaging, for example, hot cooling water, oil or fuel of a motor vehicle motor in which, in the case of cooling water, the pipe forms a connecting piece at the radiator and the fluid line forms the cooling water line.

In addition, EP 1 070 899 A2, FIGS. 3a to 3c, disclose forming on a circular coupling ring two to four axial holding arms with radial locking projections at the free ends thereof.

SUMMARY OF THE INVENTION

Therefore, it is the primary object of the present invention to provide a plug-in coupling of the above-described type which can be easily separated by means of a tool, but not manually, while still being easily couplable manually.

In accordance with the present invention, in a plug-in coupling of the above-described type, the second coupling ring part has at least three locking sections and the circumferential angle range is greater than 180°, wherein the outwardly arched parts protrude beyond the circumscribed circle of the locking sections.

As a result of the configuration according to the present invention, it is still possible to expand the second coupling ring part by means of a special tool to such an extent that the locking sections are disengaged from the holding rib in order to disconnect the coupling. However, this would be very difficult to carry out manually, even if using both hands. On the other hand, when the pipe and pipe piece are being plugged together, the second coupling ring part can still be slightly expanded while the locking sections slide over the holding rib.

In particular, the manual expansion of the second coupling part is not possible if four locking sections are provided, especially when the locking sections are uniformly distributed over the circumferential angle range. The manual expansion of the second coupling part is especially not possible if the circumferential angle range is 360°.

In accordance with a preferred feature, two holding arms are provided which are located diametrically opposite one another in relation to the pipe piece, wherein adjacent the ends of the holding arms which are connected to the second coupling ring part one of the locking sections each in the form of radially inwardly projecting locking projections are integrally formed at the coupling ring part. Together with the holding arms, these locking projections ensure that the pipe and pipe piece are securely connected in the coupled state, because the locking projections also substantially prevent a deformation of the second coupling ring part in the axial direction, even if a high axial tensile force acts on the pipe and pipe piece.

The second coupling ring part has a simple shape if two locking sections, which are located diametrically opposite one another and are offset by 90° relative to the locking projections, are constructed as arc-shaped components of the second coupling ring part. These arc-shaped components of the second coupling ring part act themselves in the manner of the locking projections without having to integrally form the components as defined locking projections at the coupling ring part.

The various features of novelty, which characterize the invention, are pointed out with particularity in the claims annexed to and forming part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
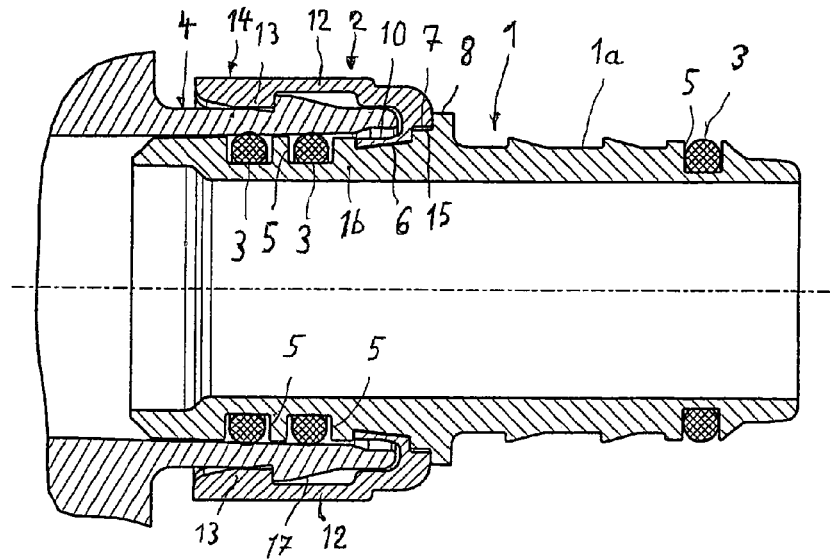
FIG. 1 is an axial sectional view of an embodiment of the plug-in coupling according to the present invention shown in the coupled state.

The embodiment of the plug-in coupling according to the present invention illustrated in the drawing includes a pipe piece 1 and a coupling ring 2 positively connected to the pipe piece 1, as well as sealing rings 3 in the form of O-rings. The pipe piece 1 and the coupling ring 2 are made of thermoplastic material in a molding tool.

The plug-in coupling is used for connecting a fluid line, for example, a hose, not shown, which can be connected to a ribbed portion 1a of the pipe piece 1, for example, by means of a hose clamp, to a pipe 4, for example, a pipe connector at the radiator of a motor vehicle.

The pipe piece 1 has circumferential grooves 5 which each receive one of the sealing rings 3, and an additional circumferential groove 6 in the end portion 1b, wherein radially outwardly projecting teeth 7 are formed in the groove 6. The pipe piece 1 further has a radially outwardly protruding collar 8 which forms a side wall of the groove 6.

Figure 5:
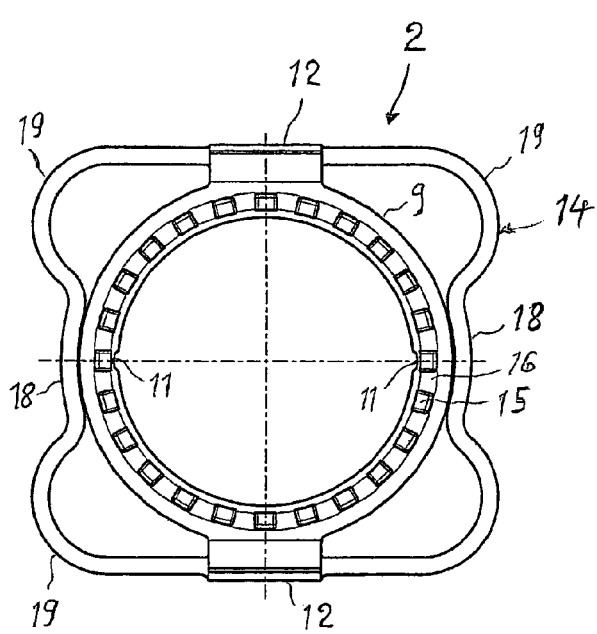
FIG. 5 is a rear view of the coupling ring of the plug-in coupling.
Figure 6:
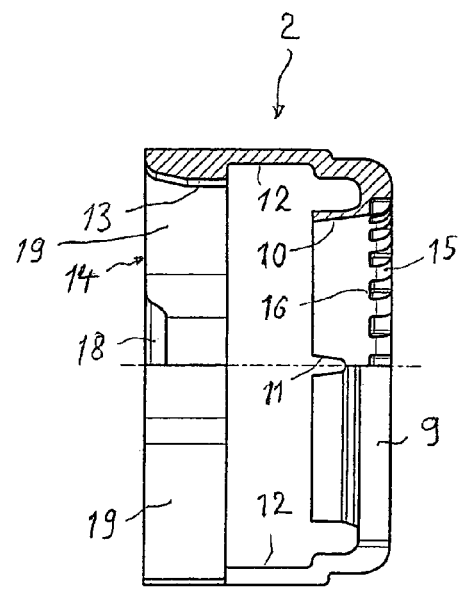
FIG. 6 is a partial axial sectional view of the coupling ring.

As particularly seen in FIGS. 5 and 6, the coupling ring 2 has at one of its ends at the inside thereof a coupling ring part 9 or collar with an axially extending, elastically expandable apron 10 in which two axially extending diametrically oppositely located slots 11 are formed which facilitate the expansion of the apron 10.

Two diametrically oppositely located, elastically bendable holding arms 12 are integrally formed with and extend radially outwardly from the coupling ring part 9. The holding arms 12 have near their other ends radially inwardly protruding locking sections 13 in the form of locking projections or hooks, wherein the holding arms 12 are connected to each other through a non-circular, elastically bendable coupling ring part 14.

The coupling ring part 9 of the coupling ring 2 is provided on its radially inner side with teeth 15 which are distributed over the circumference thereof, wherein the teeth 15 form axially extending grooves 16 therebetween.

Figure 2:
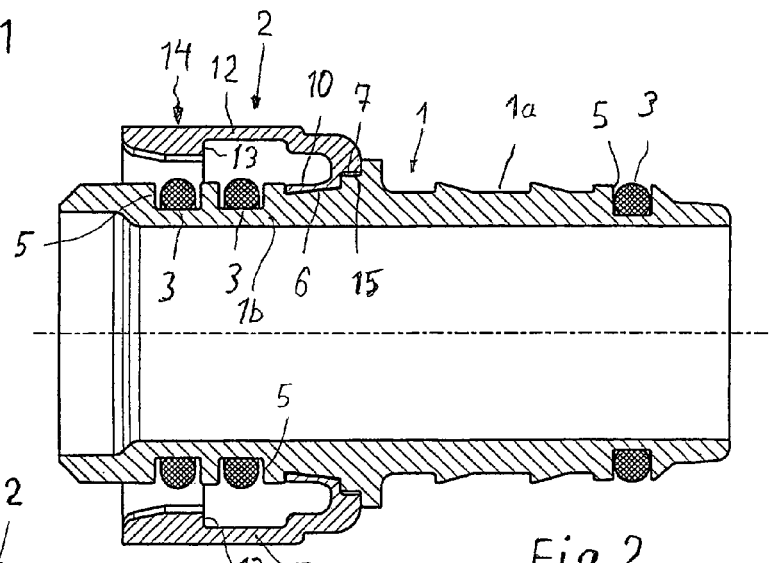
FIG. 2 is an axial sectional view of the plug-in coupling according to FIG. 1, with a positively connected and locked coupling ring and with sealing rings.
Figure 3:
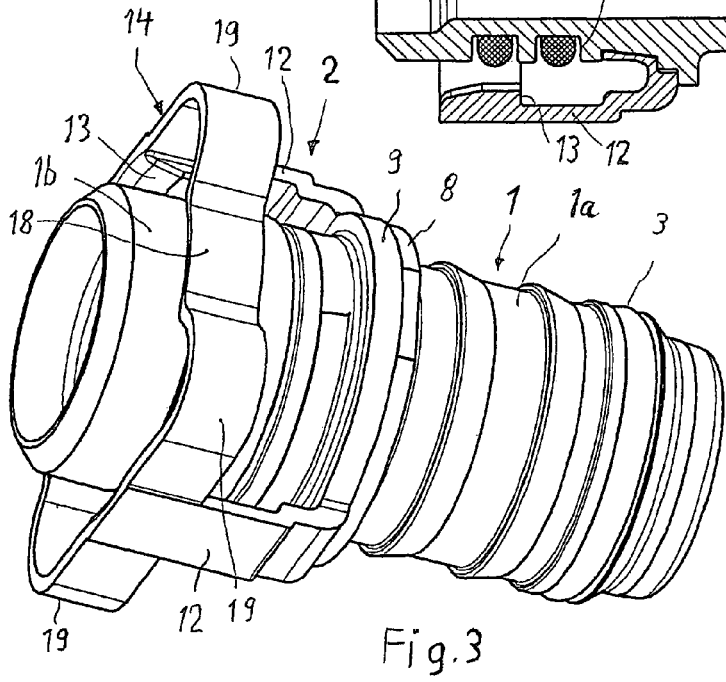
FIG. 3 is a perspective view of the components shown in FIG. 2.
Figure 4:
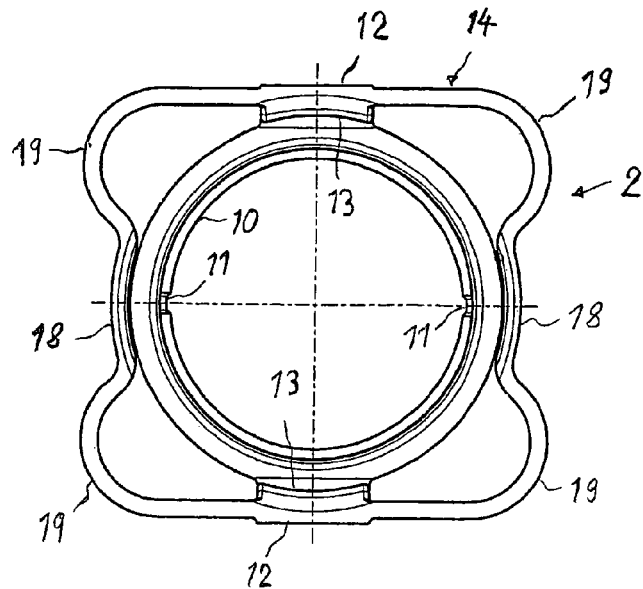
FIG. 4 is a front view of the coupling ring of the plug-in coupling.

In the coupled state of the pipe piece 1 and the coupling ring 2, in which the apron 10 has engaged in the groove 7 of the pipe piece 1, the teeth 7 of the pipe piece 1 engage in one of the grooves 16 between the teeth 15, as seen in FIGS. 1 and 2. Consequently, the coupled pipe piece 1 and the coupling ring 2 cannot be pulled apart axially and can also not be rotated relative to each other. On the other hand, the pipe piece 1 and the coupling ring 2 can be plugged together in a plurality of circumferential angle positions in dependence on the number of teeth 15, and rotated relative to each other in a circumferential angle range of altogether 300°.

The pipe 4 has in its end portion which is coupled to the end portion 1b of the pipe piece 1 an outwardly circumferential holding rib 17, as illustrated in FIG. 1. When the plug-in coupling and the pipe 4 are plugged together, the locking section 13 can engage behind the holding rib 17 while expanding the coupling ring part 14 as a result of the elastic bending capability of the holding arms 12 and the coupling ring part 14, as illustrated in FIG. 1, so that the fluid line connected to the end portion 1a is connected to the pipe 4.

In addition to the two nose-shaped locking sections 13, the coupling ring part 14 forms two additional locking sections 18 which are located diametrically opposite each other and are rotated by 90° relative to the locking sections 13, wherein these locking sections 18 also slide over the holding rib 17 and engage behind the holding rib 17 when the pipe piece 1 and the pipe 4 are plugged together.

The components 19 located between the locking sections 13 and 18 of the coupling ring part 14 are approximately circular arc-shaped and are arched outwardly over the circumscribed circle of the locking sections 13, 18. The components 19 facilitate the elastic expansion of the coupling ring part 14 when the pipe piece 1 and the pipe 4 are plugged together and the locking sections 13 and 18 slide over the conical flank of the holding rib 17 and engage behind its radial flank.

Consequently, the coupling ring part 14 can be expanded by means of a special tool until the locking sections 13 and 18 are disengaged from the holding rib 17 in order to separate the coupling. However, it is manually practically impossible to expand the coupling ring part 14 and to separate the coupling in order to ensure that no spillage occurs as a result of the separated coupling of the fluid which is conducted through the fluid line and the pipe 4, particularly if it is a fluid which is dangerous or environmentally damaging, such as cooling water, oil or fuel in a motor vehicle.

In a deviation form the embodiment illustrated in the drawings, it is also possible to provide only three locking sections if the locking sections are distributed over a circumferential angle range of more than 180°, preferably at angular spacings of 120°. However, it is also possible to provide more than four locking sections in order to further improve the safety with respect to a manual opening of the coupling.

The invention is not limited by the embodiments described above which are presented as examples only but can be modified in various ways within the scope of the protection defined by the appended patent claims.

We claim:

1. In a plug-in coupling for connecting a fluid line with a pipe, wherein the pipe includes a holding rib extending in a circumferential direction, the plug-in coupling comprising a pipe piece having a first end portion connectable to the fluid line and a second end portion adapted to be plugged together with the pipe, further comprising a coupling ring having a first coupling ring part and a second non-circular elastically expandable coupling ring part, wherein the second end portion is connectable to the first coupling ring part which is connected through elastic holding arms to the second coupling ring part, wherein the second coupling ring part has locking sections which are distributed over a predetermined circumferential angle range of a circumference of the pipe piece, wherein, when the pipe and the pipe piece are being plugged together, the locking sections slide over the holding rib and expand the second coupling ring part and engage behind the holding rib, wherein components located between the locking sections of the second coupling ring part are arched outwardly, wherein the improvement comprises that the second coupling ring part has at least three locking sections and the circumferential angle range is greater than 180°, wherein the outwardly arched parts protrude beyond a circumscribed circle of the locking sections.

2. The plug-in coupling according to claim 1, wherein the second coupling ring part has four locking sections.

3. The plug-in coupling according to claim 1, wherein the locking sections are uniformly distributed over the circumferential angle range.

4. The plug-in coupling according to claim 1, wherein the circumferential angle range is 360°.

5. The plug-in coupling according to claim 1, further comprising holding arms arranged diametrically opposite one another in relation to the pipe piece, the holding arms having ends connected to the second coupling ring part, wherein adjacent each end of the holding arms, one of the locking sections is integrally formed on the coupling ring part, wherein the locking sections are comprised of radially inwardly projecting locking projections.

6. The plug-in coupling according to claim 5, wherein two locking sections, which are located diametrically opposite each other, are located offset by 90° relative to the locking projections and are configured as arc-shaped components of the second coupling ring part.

* * * * *